(12) United States Patent
Bennett

(10) Patent No.: US 8,650,967 B2
(45) Date of Patent: Feb. 18, 2014

(54) OVERLOAD DETECTION

(75) Inventor: Ian Bennett, Gloucestershire (GB)

(73) Assignee: Messier-Dowty Limited, Gloucester (GB)

( * ) Notice: Subject to any disclaimer, the term of this patent is extended or adjusted under 35 U.S.C. 154(b) by 288 days.

(21) Appl. No.: 12/679,001

(22) PCT Filed: Sep. 19, 2008

(86) PCT No.: PCT/GB2008/003175
§ 371 (c)(1),
(2), (4) Date: Jun. 10, 2010

(87) PCT Pub. No.: WO2009/037465
PCT Pub. Date: Mar. 26, 2009

(65) Prior Publication Data
US 2010/0257923 A1   Oct. 14, 2010

(30) Foreign Application Priority Data

Sep. 19, 2007   (GB) .................................. 0718297.5

(51) Int. Cl.
*G01M 5/00* (2006.01)
(52) U.S. Cl.
USPC .............................................. 73/802; 73/760
(58) Field of Classification Search
USPC ........................................ 73/760, 802, 774
See application file for complete search history.

(56) References Cited

U.S. PATENT DOCUMENTS

| | | | |
|---|---|---|---|
| 3,655,151 A * | 4/1972 | Ferguson ..................... 244/142 |
| 3,885,428 A | 5/1975 | Dalferth |
| 4,318,561 A * | 3/1982 | Hasquenoph et al. ..... 294/82.26 |
| 4,383,698 A * | 5/1983 | Felburn ......................... 280/426 |
| 4,392,623 A | 7/1983 | Munsen et al. |
| 4,438,823 A * | 3/1984 | Hussels et al. ......... 177/210 EM |
| 4,474,060 A | 10/1984 | Crossman |

(Continued)

FOREIGN PATENT DOCUMENTS

FR    2 471 593     6/1981
GB    1366108       9/1974

(Continued)

OTHER PUBLICATIONS

International Search Report for International Application No. PCT/GB2008/003175 mailed Feb. 2, 2009.

(Continued)

*Primary Examiner* — Max Noori
(74) *Attorney, Agent, or Firm* — Marshall, Gerstein & Borun LLP

(57) ABSTRACT

An overload detecting assembly comprises a first load bearing member (10) adapted to flex laterally in response to a load to be monitored, a second load bearing member (11) spaced from the first under normal load conditions and which is contacted and loaded by the first load bearing member (10) when it is loaded beyond a load limit. Preferably, the first load bearing member (10) has a yield point below the load limit and takes a permanent set once the yield point has been exceeded. A lateral probe (18) cooperates with the first load bearing member as it moves towards the second load bearing member and in turn deflects an indicator member (20) which takes a permanent set when a yield point is exceeded. Ready inspection of the indicator member then reveals whether or not it has been bent.

19 Claims, 4 Drawing Sheets

(56) References Cited

U.S. PATENT DOCUMENTS

| | | | |
|---|---|---|---|
| 4,850,552 A | | 7/1989 | Darden et al. |
| 5,722,621 A | * | 3/1998 | Noble et al. ............ 244/215 |
| 5,927,646 A | | 7/1999 | Sandy et al. |
| 7,032,466 B2 | * | 4/2006 | McCauley ............ 73/862.53 |
| 2007/0108344 A1 | * | 5/2007 | Wood ..................... 244/102 R |
| 2007/0228825 A1 | | 10/2007 | Perriard |
| 2010/0006698 A1 | * | 1/2010 | Steinke et al. ......... 244/100 R |
| 2011/0303787 A1 | * | 12/2011 | Bennett .................. 244/100 R |

FOREIGN PATENT DOCUMENTS

| | | |
|---|---|---|
| JP | 59-36911 | 3/1984 |
| JP | 10-250526 | 9/1998 |
| JP | 11-211543 | 8/1999 |
| JP | 2004-045361 A | 2/2004 |
| RU | 1107464 C | 6/1995 |
| WO | WO-2004/074787 | 9/2004 |

OTHER PUBLICATIONS

Office Action in EP Application No. 08 806 330.0 dated Oct. 5, 2011, 5 pages.

Examination Report in GB Application No. 0718297.5 dated Mar. 28, 2011, 2 pages.

Office Action in JP Application No. P2010-525424 dated Oct. 25, 2011, 6 pages.

Office Action in CN Application No. 2008801078909 dated Apr. 24, 2012, 6 pages.

Decision on Grant in Application No. RU 2010115280 dated Sep. 14, 2012.

Search Report for International application No. PCT/GB2008/003175, dated Feb. 2, 2009.

Written Opinion for International application No. PCT/GB2008/003175, dated Feb. 2, 2009.

* cited by examiner

OVERLOAD DETECTION

TECHNICAL FIELD

This invention relates to an overload detecting assembly suitable for use in a load bearing application such as the landing gear of aircraft to monitor landing loads.

BACKGROUND

It is known to provide hard landing indicators in aircraft landing gear to support appropriate maintenance and repair regimes. A landing gear will typically comprise a shock absorber strut carrying a landing wheel assembly at its lower end and a pair of side stays connected between the strut and the aircraft fuselage. It is appreciated that loading of the side stays can be taken as an indicator of a hard landing or other adverse operating conditions. It has therefore been proposed to adapt a load bearing connector pin of a strut so that it gives an indication if it has experienced overload conditions.

An object of the invention is to provide an improved apparatus for indicating the occurrence of an overload condition in aircraft landing gear.

SUMMARY

According to the invention an overload detecting assembly comprises a first load bearing member adapted to be loaded laterally and to flex laterally in response to a load to be monitored, a second load bearing member orientated relative to the first load bearing member so as to be spaced therefrom under normal load conditions and to be contacted by and loaded by the first load bearing member when the latter is loaded laterally beyond a load limit, the first load bearing member thereafter transferring additional load to the second load bearing member.

In one embodiment, the first load bearing member has a yield point set below the load limit and takes a permanent deflected set once the yield point has been exceeded. The yield point may occur before the first and second load bearing members engage, or when they engage.

In an alternative embodiment of the invention, in which the first load bearing member may or may not reach a yield point, the assembly includes a load indicator in the form of one or more lateral probes which each cooperate with the first load bearing member as it moves towards engagement with the second load bearing member and in turn deflect an indicator member having a yield point which when exceeded by contact with the lateral probe takes a permanent set. This can happen either before the load bearing members engage or when they engage. Simple inspection of the central bore of the second load bearing member then reveals whether or not the indicator member has been bent, irrespective of whether or not the first load bearing member has taken a permanent set. However, in yet another embodiment of the invention, if the first load bearing member is adapted to take a permanent set indicative of a yield point, this will be sufficient to hold the indicator member in a set state, and it therefore need not have a yield point itself.

Preferably, the first load bearing member comprises a tubular member that receives the second load bearing member within it so that the two members engage via lands at opposite ends and are spaced apart in a central region to allow flexing of the first load bearing member relative to the second load bearing member under load. Both load bearing members may comprise cylindrical members arranged concentrically. In the alternative embodiment which includes an indicator member, the indicator member may comprise a cylindrical member located within the bore of the second load bearing member and engaged by the lateral probe passing through an aperture in the second load bearing member. The probe may comprise a pin mounted in said aperture between the first load bearing member and the indicator member so as to transfer flexing of the first load bearing member to the indicator member. Clearance may be provided to accommodate small movements of the pin without causing movement of the indicator member.

DESCRIPTION OF THE DRAWINGS

The invention will now be described by way of example with reference to the accompanying drawings.

EMBODIMENTS OF THE INVENTION

Figure 1:
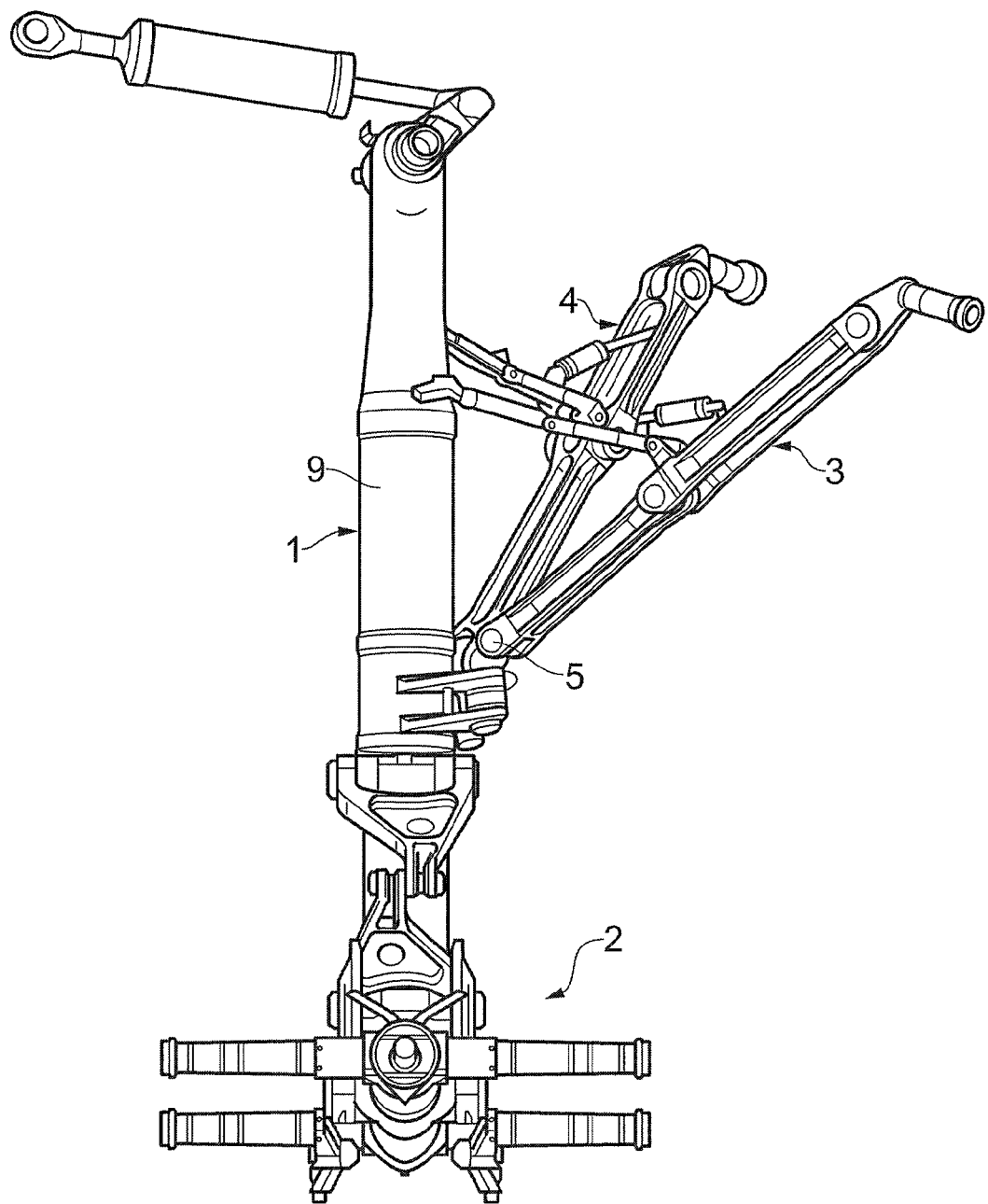
FIG. 1 is a schematic drawing of an aircraft landing gear.

FIG. 1 shows a landing gear assembly comprising a shock absorber strut 1 pivotally connected to a landing gear bogie 2 at its lower end and which is adapted to be connected to the fuselage of an aircraft at its upper end so that it can be deployed for landing or retracted into a storage bay in the fuselage. A pair of side stays 3, 4 are connected between the outer casing 9 of the strut 1 and the fuselage and serve to stabilise the position of the strut in operation. In combination, the stays react fore and aft loads and side loads. Each side stay is connected to the casing 9 of the strut via a pivot pin 5 and is pivotally connected to the fuselage at its remote end so as to fold with the landing gear when deployed or stowed. In operation, the side stays 3, 4 bear loads related to the load applied to the landing gear assembly and therefore loading of a stay is indicative of landing loads. The invention provides an overload indicator which is responsive to the load in a side stay. This overload indicator is incorporated in the pivot pin 5 connecting the lower end of a side stay to the casing 9 of the shock absorber strut 1.

Figure 2:
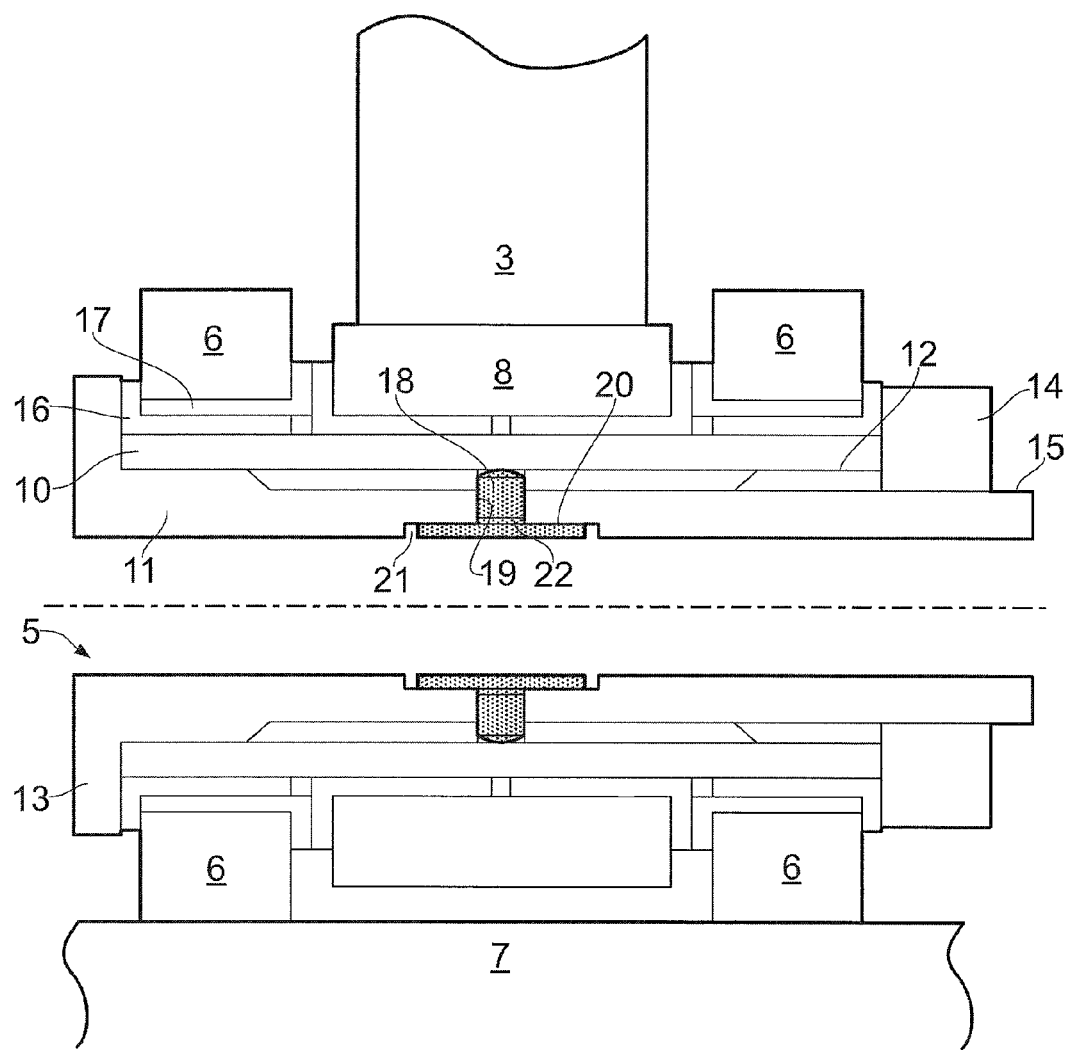
FIG. 2 is an axial section of a pivot pin according to the invention in its non-loaded condition.

FIG. 2 shows a pivot pin 5 incorporating the invention and fitted between a pair of lugs 6 connected to the strut casing 9 and an eye 8 at the lower end of the side stay 3. The pivot pin comprises an outer cylindrical load bearing member 10 arranged concentrically with an inner cylindrical load bearing member 11. The two load bearing members engage at opposite ends via lands 12 and the inner load bearing member 11 has a reduced thickness therebetween in its central region so as to create a separation between the surfaces of the two load bearing members. The pivot pin 5 is inserted through apertures in the lugs 6 and the eye 8 of the side stay 3. A radially extending flange 13 formed on one end of the inner load bearing member 11 abuts the outer side of one lug 6 and a retaining nut 14 engages a threaded portion 15 of the inner load bearing member 11 at the opposite end from the flange 13 and abuts an outer side of the second lug 6 so as to secure the pivot pin in place. A pair of L-shaped spacer sleeves or bushes 16, 17 are provided at each end between the lug 6 and the outer load bearing member 10. The lugs 6 are aligned with the lands 12. A pair of spacer sleeves or bushes 23 are also provided between the eye 8 of the side stay 3 and the outer load bearing member 10.

The pivot pin 5 also incorporates a pair of sensor pins 18 which are mounted in apertures 19 in the inner load bearing member 11 so as to extend radially on opposite sides of the centre-line of the pin along the longitudinal axis of the side stay 3. Each pin 18 engages against the inside of the outer load bearing member 10 and has an overall axial length such that its inner end does not then extend from the inner end of aperture 19. An annular indicator 20 in the form of a sleeve (which may be a split sleeve for ease of assembly) is located within a shallow recess 21 in the bore of the inner load bearing member 11 such that in its non-activated state it lies fully within the recess 21 and is flush with the bore of the inner load bearing member 11. A small clearance 22 is provided between the ends of the sensor pin 18 and the indicator sleeve 20 and outer load bearing member 10. In order that the sensor pins 18 remain aligned with the longitudinal, load bearing axis of the side stay 3, the inner load bearing member 11 is fixed against rotation by engagement of location means between the flange 13 and the adjacent lug 6 (not shown).

Figure 3:
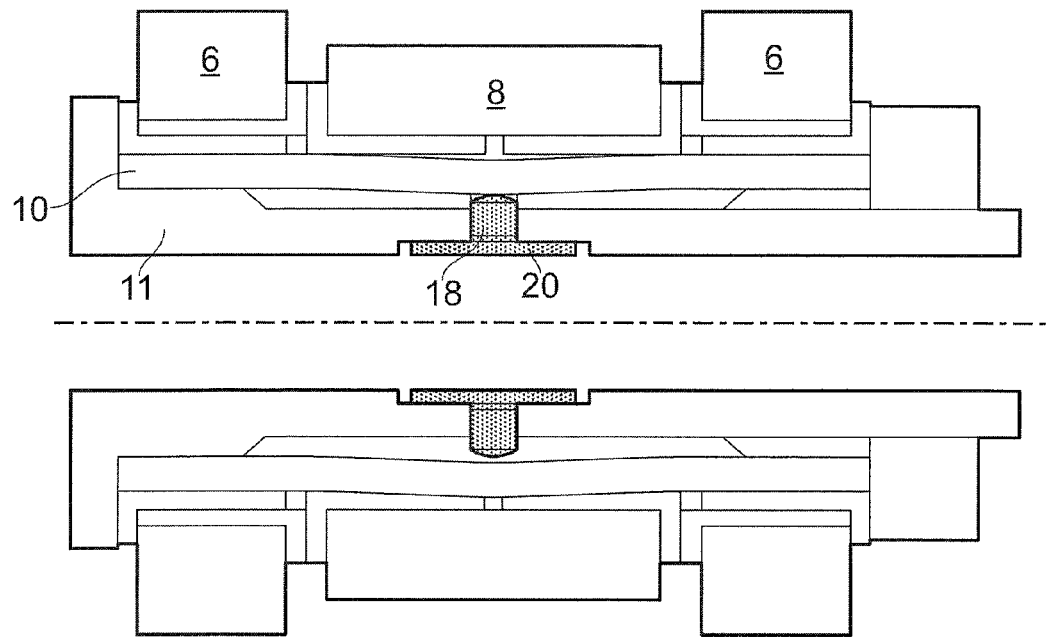
FIG. 3 is an axial section of the pivot pin of FIG. 1 in a lightly loaded condition.

In operation, as a compression load is applied to the side stay 3, this is applied to the pivot pin 5 and causes the outer load bearing member 10 to flex, as shown in FIG. 3. Under light load conditions below a yield point, the outer load bearing member does not take a permanent set when deflected and returns to its normal cylindrical shape once the load is removed by virtue of its resilient material properties. As shown in FIG. 3, the extent of the flexing of the outer load bearing member is such as to engage one of the sensor pins 18 and to push it into the aperture 19 to close the clearance 22. At this stage, the sensor pin 18 may engage the indicator sleeve 20 but does not deflect it. Further deflection of the outer load bearing member 10 under increased load causes the sensor pin 18 to deflect the indicator 20 inwardly, but the indicator does not take a permanent set until a yield point defined by the indicator material is reached. Therefore, if the applied load is reduced, the indicator 20 returns to its normal position by virtue of its own resilient material properties.

Figure 4:
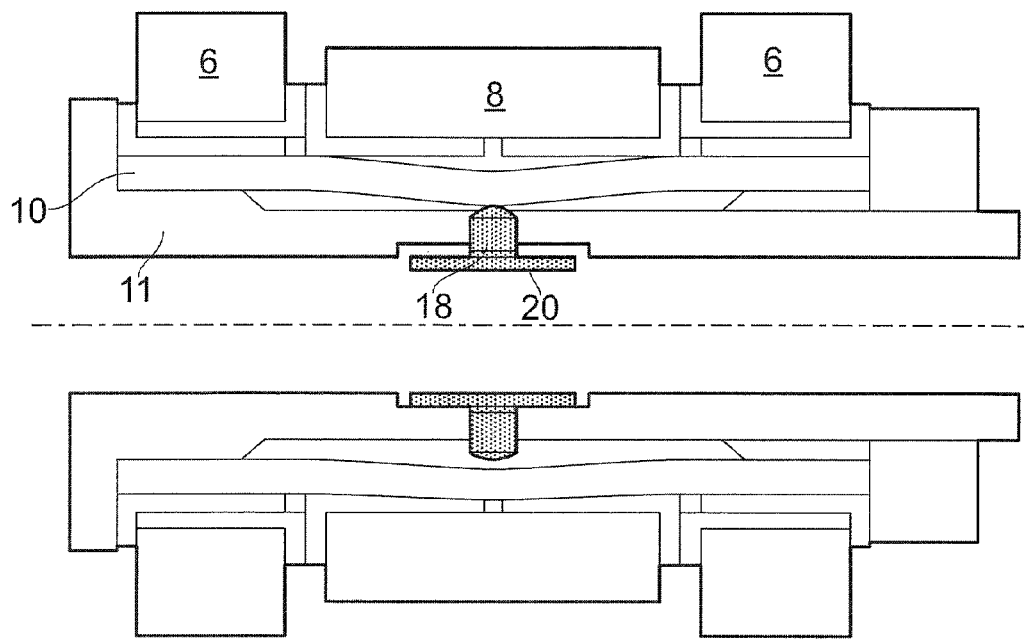
FIG. 4 is an axial section of the pivot pin of FIG. 1 in a loaded condition that operates an indicator.

Under overload conditions, once the compression load exceeds an indicator threshold, the outer load bearing member 10 is deflected to such an extent as to displace the sensor pin 18 and indicator 20 so that one of the yield points of the outer load bearing member 10 or indicator 20 is exceeded, whereupon the indicator 20 does not return to its normal position once the load is reduced below the indicator threshold. If the yield point of the outer load bearing member 10 is exceeded, it takes a permanent set and serves to hold the sensor pin 18 and indicator 20 in the projecting state shown in FIG. 4. It therefore does not matter whether the indicator 20 has exceeded its own yield point itself because it is not free to return to its normal position. In an alternative embodiment of the invention, the indicator 20 is arranged to be deflected beyond its yield point when the indicator load is exceeded, and it does not then matter if the outer load bearing member 10 has not exceeded its yield point and returns to its normal position when the applied load is removed. Therefore, in each of these embodiments, the indicator 20 is permanently displaced inwardly of the central bore of the inner load bearing member 11 once the indicator load has been applied or exceeded, and this serves as an indication of an overload event for maintenance or service personnel who are able to check by inspection of the bore of the inner load bearing member. Inspection may be visual inspection or tactile inspection using for example a gauge to detect deformation of the indicator 20.

Figure 5:
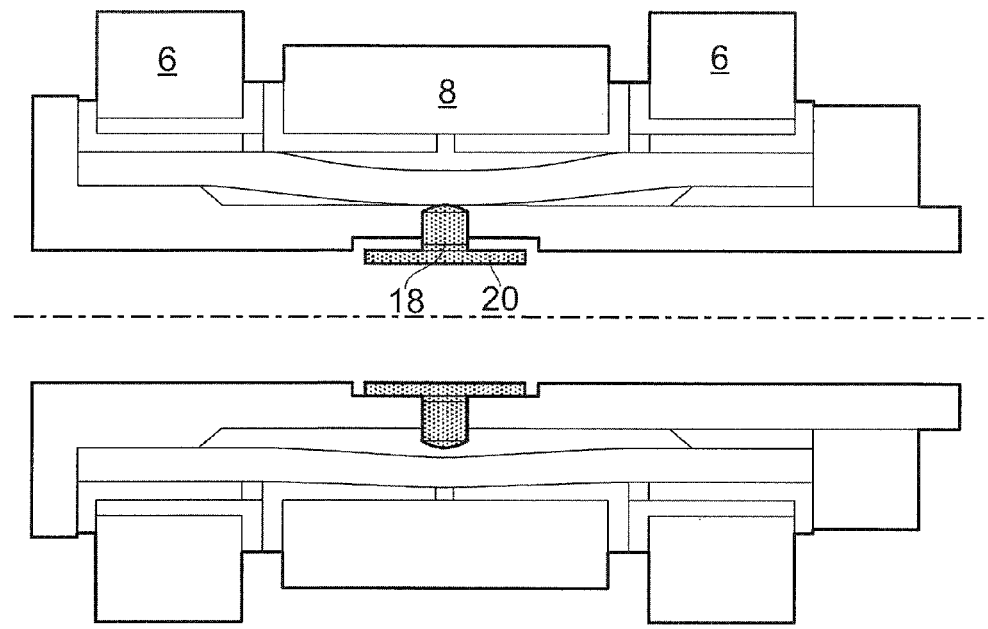
FIG. 5 is an axial section of the pivot pin in FIG. 1 in a more fully loaded condition than in FIG. 4.

If the compression load applied to the side stay 3 is increased beyond the indicator load, then the outer load bearing member 10 will continue to flex and will eventually close the gap with the inner load bearing member 11 to engage the latter, as shown in FIG. 5. Any further increase in load will then be transferred to the inner load bearing member. The inner load bearing member can be made as strong as required to match the loads for which the apparatus is designed.

Whilst the operation of the pivot pin 5 has been described above by reference to a compression load which operates one of the two aligned sensor pins 18, it will be appreciated that a tension load applied to the side stay 3 will cause the outer load bearing member 10 to flex in the opposite direction and operate the other of the two sensor pins 18.

Figure 6:
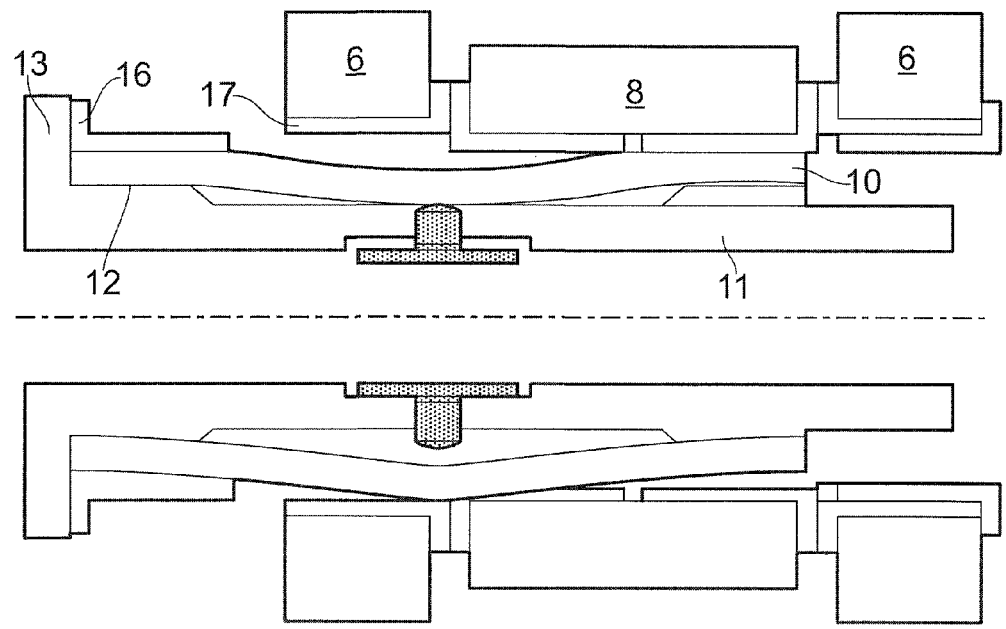
FIG. 6 is an axial section of the pivot pin in FIG. 1 showing it being removed from engagement within the members which it connects together.

Once the indicator 20 has been operated, the pivot pin 5 will need to be serviced to reset it. This is done by removing the locating nut 14 and withdrawing the pivot pin 5 from the assembly, as shown in FIG. 6. This illustrates that the provision of the bush 16 adjacent the flange 13 allows this to be removed with the pivot pin 5 so as to leave an enlarged opening through which the deflected body of the outer load bearing member 10 can be withdrawn. The whole pivot pin assembly can then either be replaced or the indicator 20 and outer load bearing pin 10 can be replaced. The latter option may be facilitated in an alternative embodiment of the invention by arranging that the land 12 adjacent the threaded portion 15 is formed by a separate concentric sleeve or is formed in the bore of the outer load bearing member 10.

As shown in the drawings, there are two bushes 16, 17 at each end of the pivot pin 5, but these may be replaced by a single bush 17 at that end of the pin nearest the threaded portion 15 without adversely affecting the ability to remove the pin from the apparatus.

Although the embodiment described has the inner load bearing member 11 fixed against rotation within the lugs 6, in other embodiments of the invention the inner load bearing member 11 might be free to rotate within the lugs 6 and additional sensor pins 18 provided so that one of them is always substantially aligned with the direction of the applied load.

The invention claimed is:

1. An overload detecting assembly comprising:
a first load bearing member adapted to be loaded laterally and to flex laterally in response to a load to be monitored,
a second load bearing member orientated relative to the first load bearing member so as to be spaced therefrom under normal load conditions and to be contacted by and loaded by the first load bearing member when the latter is loaded laterally beyond a load limit, the first load bearing member thereafter transferring additional load to the second load bearing member; and
a load indicator in the form of a lateral probe which cooperates with the first load bearing member as it moves towards engagement with the second load bearing member and in turn deflects an indicator member.

2. An assembly as claimed in claim 1 in which the first load bearing member has a yield point set below the load limit and takes a permanent deflected set once the yield point has been exceeded.

3. An assembly as claimed in claim 1 in which the yield point may occur before the first and second load bearing members engage, or when they engage.

4. An assembly as claimed in claim 1, wherein the first load bearing member is an outer cylindrical member and the second load bearing member is an inner cylindrical member that is received at least partially within a bore of the first load bearing member.

5. An assembly as claimed in claim 1 in which the indicator member has a yield point which when exceeded by contact with the lateral probe takes a permanent set.

6. An assembly as claimed in claim 5 in which the indicator member takes a lateral set either before the load bearing members engage or when they engage.

7. An assembly as claimed in claim 1 in which the indicator member is held in a deflected position by a lateral probe due to a permanent set of the first load bearing member.

8. An assembly as claimed in claim 1 in which the first load bearing member comprises a tubular member that receives the second load bearing member within it so that the two members engage via lands at opposite ends and are spaced apart in a central region between the lands to allow flexing of the first load bearing member relative to the second load bearing member under load.

9. An assembly as claimed in claim 8 in which both load bearing members comprise cylindrical members arranged concentrically.

10. An assembly as claimed in claim 1 in which the indicator member comprises a cylindrical member located within a bore of the second load bearing member and engaged by the lateral probe passing through an aperture in the second load bearing member.

11. An assembly as claimed in claim 10 in which the probe comprises a pin mounted in said aperture between the first load bearing member and the indicator member so as to transfer flexing of the first load bearing member to the indicator member.

12. An assembly as claimed in claim 11 in which a clearance is provided to accommodate small movements of the pin without causing movement of the indicator member.

13. An assembly as claimed in claim 11 in which multiple probes are provided similar to said lateral probe and arranged in circumferentially spaced locations around the tubular member.

14. An assembly as claimed in claim 1 further comprising a radial flange connected to the second load bearing member and adapted to axially abut a side of one of two components to be connected together by insertion of the assembled load bearing members into apertures in said two components.

15. An assembly as claimed in claim 14 in which the assembled load bearing members comprise a pivot pin.

16. An assembly as claimed in claim 1 in a side stay of an aircraft landing gear.

17. An aircraft landing gear comprising an assembly as claimed in claim 1.

18. An aircraft comprising an overload detecting assembly as claimed in claim 1.

19. An assembly as claimed in claim 4, wherein the second load bearing member includes a reduced thickness section that creates a separation between the first load bearing member and the second load bearing member in the region of reduced thickness.

* * * * *

UNITED STATES PATENT AND TRADEMARK OFFICE
CERTIFICATE OF CORRECTION

PATENT NO.        : 8,650,967 B2                                    Page 1 of 1
APPLICATION NO.   : 12/679001
DATED             : February 18, 2014
INVENTOR(S)       : Ian Bennett It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 499 days.

Signed and Sealed this

Twenty-ninth Day of September, 2015

Michelle K. Lee
*Director of the United States Patent and Trademark Office*